United States Patent [19]

Broughton

[11] 4,175,636
[45] Nov. 27, 1979

[54] HEAVY LIFT AIR CUSHION AMPHIBIOUS VEHICLE

[76] Inventor: Jacksel M. Broughton, 4096 Bonita View Dr., Bonita, Calif. 92002

[21] Appl. No.: 873,015

[22] Filed: Jan. 27, 1978

[51] Int. Cl.² .............................................. B60V 1/00
[52] U.S. Cl. .................................. 180/119; 180/124; 180/127
[58] Field of Search ............................ 180/116–121, 180/124, 127

[56] References Cited

U.S. PATENT DOCUMENTS

| | | | |
|---|---|---|---|
| 2,972,327 | 2/1961 | Paul | 180/117 |
| 3,078,939 | 2/1963 | Bollum | 180/120 X |
| 3,177,960 | 4/1965 | Cockerell | 180/129 |
| 3,387,685 | 6/1968 | Fresh | 180/119 |
| 3,443,659 | 5/1969 | Moore | 180/118 |
| 3,581,697 | 6/1971 | Gunther | 180/116 X |
| 3,810,522 | 5/1974 | Morgan | 180/116 |
| 3,850,126 | 11/1974 | Leonard | 180/117 X |

FOREIGN PATENT DOCUMENTS

| | | | |
|---|---|---|---|
| 929191 | 6/1973 | Canada | 180/117 |
| 1120824 | 7/1968 | United Kingdom | 180/119 |
| 1296044 | 11/1972 | United Kingdom | 180/116 |
| 1499317 | 2/1978 | United Kingdom | 180/119 |

*Primary Examiner*—Trygve M. Blix
*Assistant Examiner*—Terrance L. Siemens
*Attorney, Agent, or Firm*—William H. Maxwell

[57] ABSTRACT

An air cushion vehicle operable over land, water and ice separately and in any combination, wherein there is a hull of "lighter" configuration adapted to be collapsed for highway transport and to be expanded for use with a prime mover fan both for lift and propulsion when in use, with a perimeter skirt and a center roll stabilizer responsive to air pressures in separated chambers established thereby, and with a tread type labyrinth seal for lift air control, and there being a steerable nose wheel and trailing casters for direction control.

26 Claims, 14 Drawing Figures

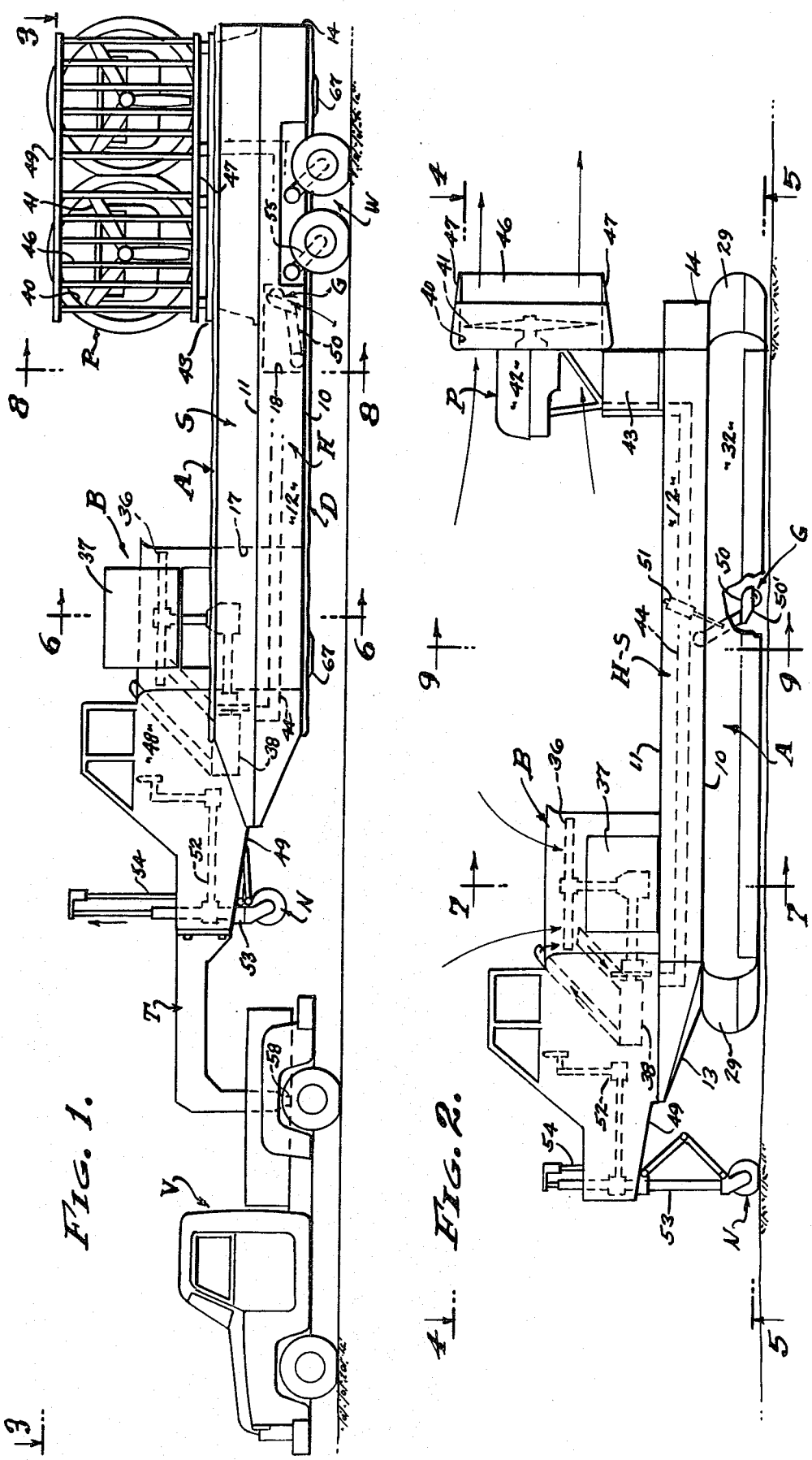

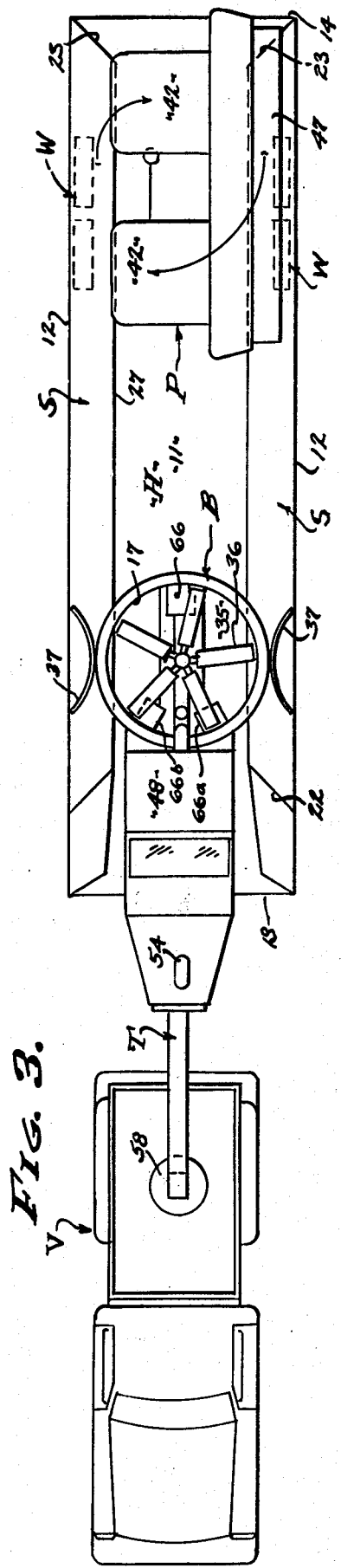
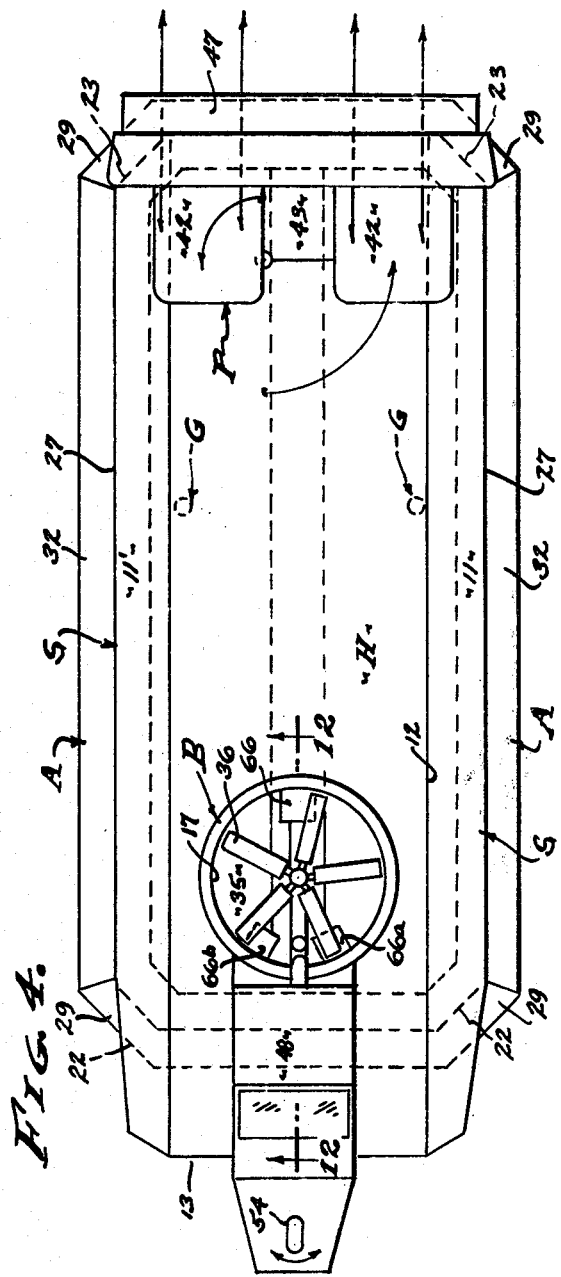

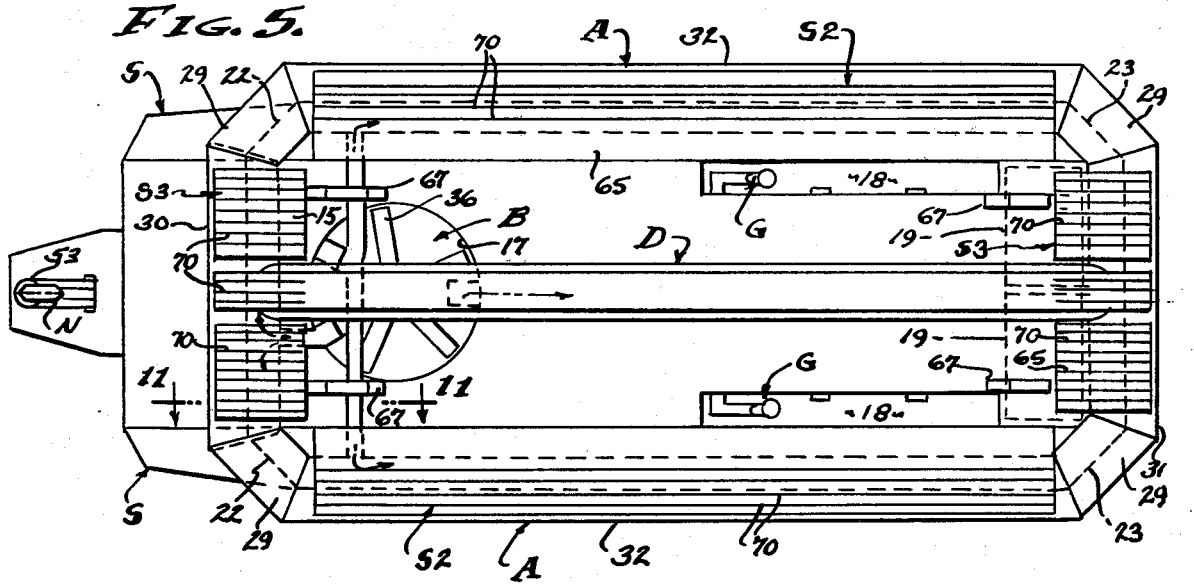
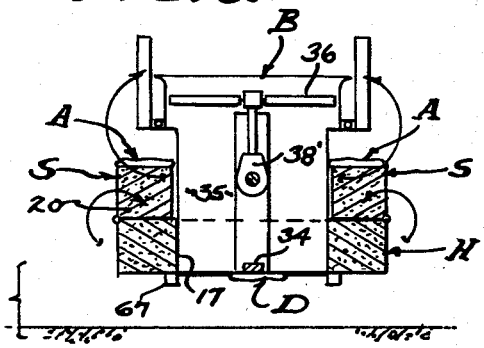
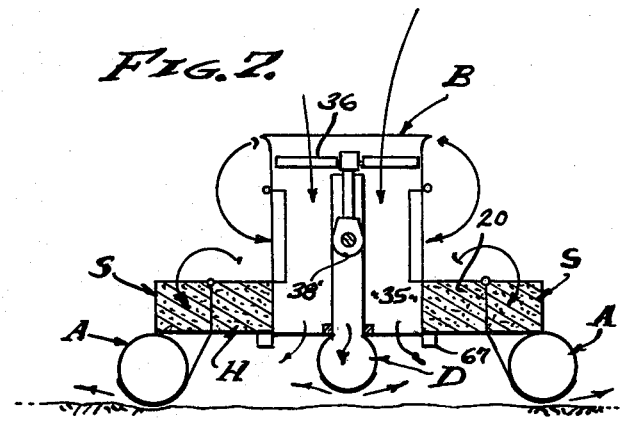
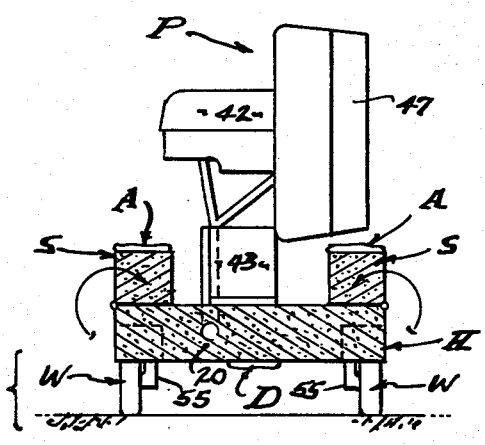
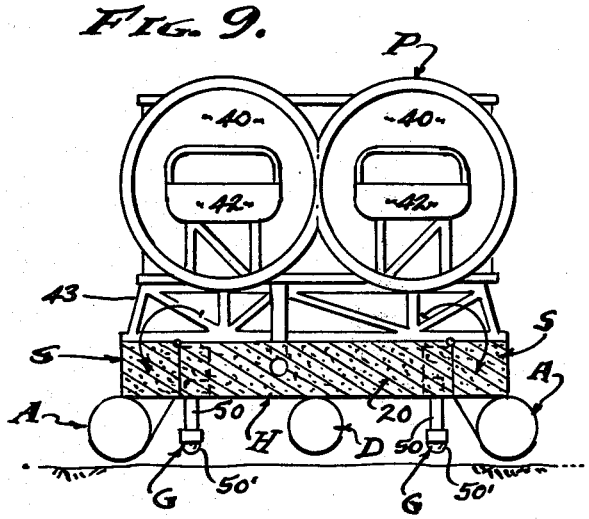

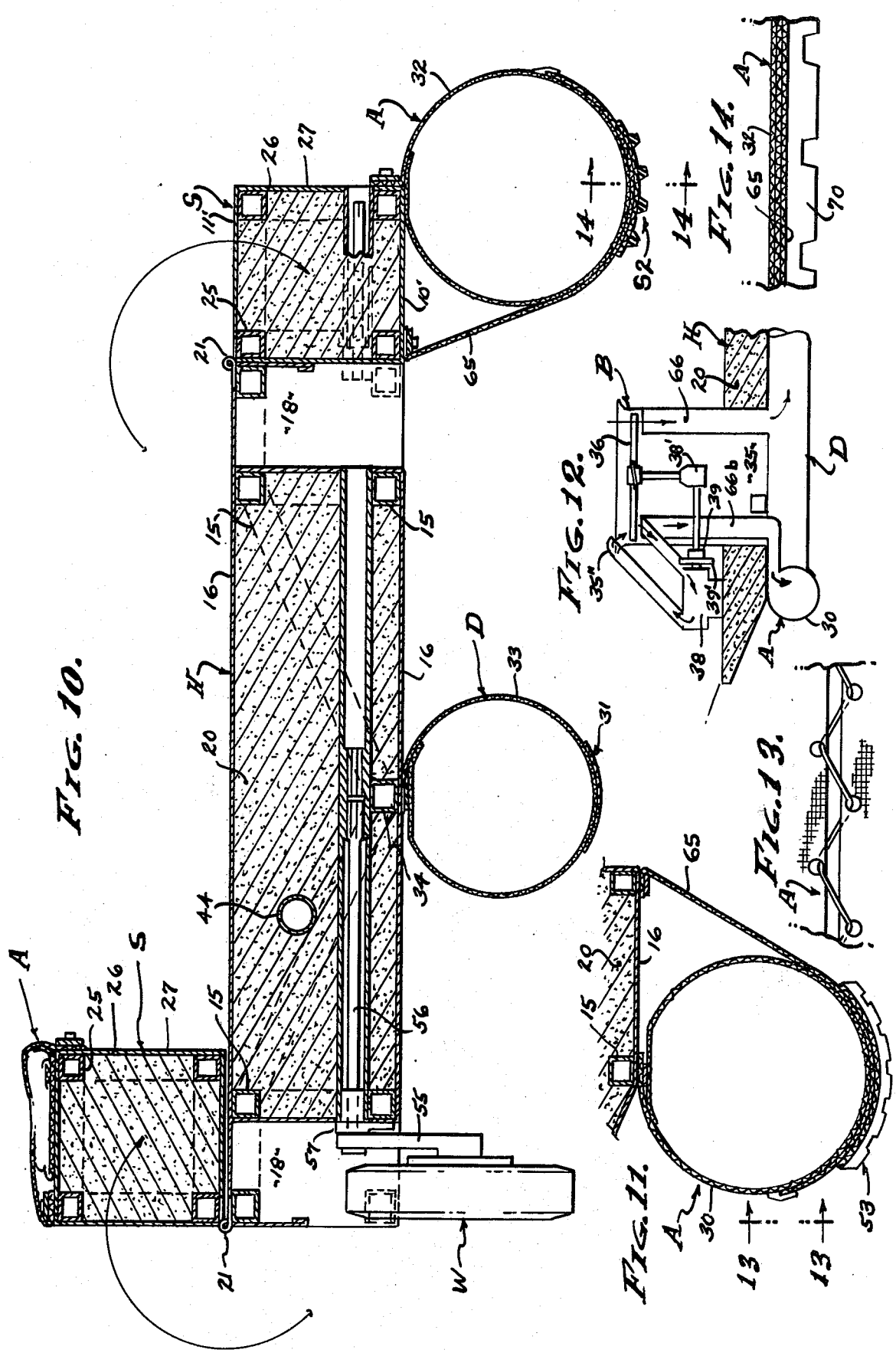

HEAVY LIFT AIR CUSHION AMPHIBIOUS VEHICLE

BACKGROUND

This invention relates to air cushion vehicles wherein powered fans provide vertical lift and horizontal propulsion, it being a general object to provide a maneuverable vehicle of substantial size adaptable to a multitude of practical purposes. The concept herein disclosed provides a vehicle adapted to operate over land, water, ice, mud, marsh, agricultural crops, or any combination thereof, and over many surfaces that would restrict or preclude the movement of more conventional vehicles. Primarily with vehicles of the type under consideration, it is obstacles and interruptions and/or grades and undulations in the earths surface which are to be encountered and successfully traversed. And it is a matter of economics that such a vehicle be acceptable with respect to fuel consumption as related to both speed and load capabilities, and it is here that the vehicle of the present invention compares most favorably with conventional aircraft, helicopters and hovercraft and the like. For example, the air cushion vehicle herein disclosed having a true cargo capability of 5,000 lbs. uses 25 gals. of fuel per hour with a total direct operating cost of $53 per hour; as compared with a British Hovercraft known as the SR N6 having a true cargo capability of 4,400 lbs. that uses 88 gals. of fuel per hour with a total direct operating cost of $227 per hour; or as compared with a Sikorski helicopter known as the S-58T having a true cargo capability of 3,170 lbs. that uses 110 gals. of fuel per hour with a total direct operating cost of $368 per hour; as compared with a Sikorski helicopter known as the S-61N having a true cargo capability of 3,785 lbs. that uses 160 gals. of fuel per hour with a total direct operating cost of $643 per hour; or as compared with the Bell Aero Space air cushion vehicle known as the Viking having a true cargo capability of 6,500 lbs. that uses 90 gals. of fuel per hour with a total operating cost of $205. Notice that the fuel consumption and operating cost per hour is far less with the air cushion vehicles as compared with helicopters, and that these operating figures are far less with the concept herein disclosed as compared with the closest related (British Hovercraft and Bell Aero) prior art. Additionally, the said total direct operating cost referred to herein considers the factors of initial cost, range with cargo, hourly operating cost, hourly maintenance cost, and hourly depreciation cost. Generally therefore, it is an improved air cushion vehicle that is hereinafter disclosed and claimed.

The air cushion vehicle herein disclosed is essentially of "lighter" configuration, a substantially large flat bottomed barge with useful open deck space. That is, it is a work machine unencumbered by the conventional limitations of wheels or tracks, or by rotor blades, or by hull draft when used over water. Characteristically, this vehicle comprises a virtually unsinkable monocoque hull fabricated over a space frame with a durable shell filled with cellular foam plastic for strength and flotation; i.e. 200% displacement of its gross weight in sea water. In practice, aluminum tubing and sheet combined with resin bonded fiberglass is employed in the construction, it being an object to provide a relatively light weight structure for its size, and of durable construction that will remain sound and operable under the most adverse circumstances.

The air cushion vehicle herein disclosed is characterized by a lift plenum bordered by a seal or skirt that is flexible so as to move over irregularities of the terrain or water surface and/or any combination thereof which may be encountered. Low pressure air, for example at 35 lbs. per square foot (¼ lb. per square inch) is dynamically supplied to the lift plenum and permitted to discharge from beneath the skirt that is juxtaposed to the supporting surface. It is an object herein to provide a versatile and extremely wear resistant peripheral skirt system that is adapted to encounter and surmount obstacles such as steps and undulations in the supporting surface, and voids therein as well such as ditches and the like. With the skirt system hereinafter disclosed, there is an inflated perimeter wall of woven fiber and plastic, unaffected by climatic changes and serviceable by means of its zippered or lapped together panel sections which facilitate rapid installation, inspection and replacement for repair. In practice, the skirt is comprised of interconnected tubes that are of substantial cross section and adapted to be depressed by obstacles as variations in the supporting surface are encountered. The escape of plenum air is via an air gap that averages ½ inch beneath the skirt.

It is an object of this invention to provide increased stability in an air cushion vehicle of the type under consideration, namely roll control whereby the desired air gap beneath the skirt is maintained. With the present invention there is a roll stabilizer divider that symmetrically separates the plenum into right and left chambers for receiving lift air from an axial flow lift fan. The said fan supplies sufficient excess cushion capacity for crossing ditches and for overcoming lop-sided obstacles.

It is also an object of this invention to provide an air cushion vehicle having the features thus far described and which can be diminished in size for transport, without dismantling. That is, the vehicle components remain integrally attached and are moveable into working positions while augmenting the vehicle to its operable configuration and full size. With the present invention, highway mobility is provided in the diminished configuration, with the attachment of and/or lowering of a wheeled support, together with inward folding of the opposite side margins of the hull and with rotation of the propulsion unit from a beam-to-beam into a fore-and-aft disposition. The purpose of said folding and rotation of elements is to narrow the structure so as to be within the width limits for conventional highway transport. With this invention, the opposite sides of the hull comprise sponsons hingedly attached thereto to extend coextensive with the hull respectively, and the propulsion unit comprises a turret-like bridge that overlies the hull and sponsons when disposed transversely and which is confined to overlie the hull when disposed longitudinally. In practice, the propulsion unit is located aft on the hull, while the lift fan unit is located forward in the hull with an adjoining pilot house facing forwardly therefrom.

It is still another object of this invention to provide for directional control and maneuverability. The propulsion unit is composed of engine driven propeller means, preferably right and left reversible and variable speed propellers on substantially spaced axes. Moderate and high speed turning is accomplished with a cascade of vanes (rudders) in the propeller driven slip-stream, and which is amplified by asymmetrical throttle control. Directional stability is precisely controlled by means of castering tracking gears and an extensible steering nose wheel. The tracking gears trail with a downward pressure to support a portion of the vehicle weight, say for example 10%-20% thereof, and they can be raised and lowered independently or operated in conjunction with the nose wheel. And, the nose wheel is also retractable. Thus for example, precise directional control can be utilized for furrow following in agricultural operations, similar to a water keel effect which is also provided by the longitudinally disposed skirts and center roll stability divider.

A feature of the air cushion vehicle herein disclosed is its ability to successfully encounter substantial irregularities in rolling terrain and water swells, all by virtue of the large diameter skirt tubes and placement of the hull bottom over said tubes. Therefore, and much like aircraft in close ground proximity, there is a ground effect with the dynamic escape of lift air which tends to maintain a uniform separation between the depressible skirts and the terrain or water surface. For example, with a skirt of 24 inch diameter, a 20 inch boulder will pass beneath without notice. However, such an obstacle more than 24 inches high will of course come into contact with the hull and impair progress. Still further, climbing capability is within the operation of this air cushion vehicle, and for example in the embodiment described herein is capable of ascending a 20%-22% grade, and steeper slopes dependent upon approach speed and grade transition. While this air cushion vehicle is capable of relatively high over the surface speeds, work capabilities have dominated the concept so that commercial operation thereof is in the 20-40 m.p.h. range, while top speed is in the 50-100 m.p.h. range. In practice, three 200 horse power aircraft type reciprocating gasoline engines, one for the lift unit and two for the propulsion unit are employed.

Finally, it is an object to transport this air cushion vehicle over highways in its diminished configuration, and to this end a tow bar is attached thereto and hitched to a fifth wheel support of a tractor vehicle or truck as shown in the drawings.

SUMMARY OF INVENTION

From the foregoing it will be apparent that this invention relates to an air cushion vehicle of substantial size, the configuration disclosed herein being 35 feet long and 14 feet wide in its augmented condition, and of 12,300 lbs. gross weight with 5,000 lbs. deck load, while its flotation displacement is 20,000 lbs. in sea water. It is to be understood that this configuration can be varied as circumstances require without deviating from the concept which involves generally, an elongated hull H of rectangular cross section, sponsons S coextensive with and moveable into and out of position along each side of the hull, air cushion skirts A depending from the hull-sponson perimeter, an air cushion roll stabilizer divider D depending from the hull so as to establish separate air cushion plenum chambers beneath each side of the hull respectively, lift air means B to pressure the plenum chambers beneath the hull, air propulsion means P to propel the vehicle and with steering means for directional orientation, tracking gear G and nose wheel N for directional stability, and transport wheels w and a tow bar T for highway mobility. The vehicle as it is comprised of the foregoing elements and means has two configurations, a diminished configuration as shown in FIG. 1 for highway mobility, and an augmented configuration as shown in FIG. 2 for operational utility. The mobile configuration employs a tractor V that tows the collapsed or folded vehicle of diminished form to and from the sites of operation.

DRAWINGS

The various objects and features of this invention will be fully understood from the following detailed description of the typical preferred forms and applications thereof, throughout which description reference is made to the accompanying drawings, in which:

FIG. 1 is a side elevation of the air cushion vehicle in its transportable condition.

FIG. 2 is a side elevation of the air cushioned vehicle in its utilitarian condition.

FIGS. 3 and 4 are plan views taken as indicated by lines 3—3 and 4—4 on FIGS. 1 and 2 respectively.

FIG. 5 is a bottom view taken as indicated by line 5—5 on FIG. 2.

FIGS. 6 and 7 are transverse sectional views taken as indicated by lines 6—6 and 7—7 on FIGS. 1 and 2 respectively.

FIGS. 8 and 9 are transverse sectional views taken as indicated by lines 8—8 and 9—9 on FIGS. 1 and 2 respectively.

FIG. 10 is an enlarged detailed view illustrating the moveability of parts as they are positioned in FIGS. 7 and 8.

FIG. 11 is an enlarged detailed view taken as indicated by line 11—11 on FIG. 5.

FIG. 12 is a longitudinal section taken as indicated by line 12—12 on FIG. 4.

FIG. 13 is an enlarged detailed view taken as indicated by line 13—13 on FIG. 11, and FIG. 14 is an enlarged detailed section taken as indicated by line 14—14 on FIG. 10.

PREFERRED EMBODIMENT

Referring now to the drawings, this vehicle is generally of "lighter" form having a hull H of barge shape with a flat bottom 10, a deck 11 and sides 12, and characterized by an elongated rectangular cross section. The plan form is also rectangular with a sled bow 13 and a transom stern 14, generally a scow with an open deck for lightering or other suitable adaptations. A feature of the hull H, and also of the sponsons S later described, is the non-sinkable structure thereof which comprises a space frame 15 within a shell 16 filled with cellular plastic having flotation capability together with the sponsons of approximately 200% of the gross weight involved. As shown, the space frame 15 involves tubular longitudinal and transverse members defining the deck corners of the hull bottom, deck, sides, bow and stern; and various other longitudinal and transverse beams and trusses generally as shown and as may be required to give rigidity to the frame and hull configuration established thereby.

In accordance with this invention, the frame 15 establishes a blower duct 17 extending through the forebody of the hull between the bottom 10 and deck 11, and it establishes tracking gear and wheel wells 18 at opposite sides 12. The frame 15 is reinforced at the duct 17 and wells 18, which are lined with a skin of sheet aluminum to form shell continuations integral with the shell form of the bottom, deck and sides of the hull. Accordingly, the shell 16 presents a closed chamber or vessel which is then filled to capacity with a foamed cellular plastic core 20 of substantially light weight, 2 lbs. per cubic foot density, and which is impervious to water so as to ensure flotation. In practice, the afterbody of the hull accommodates fuel tanks 19 around which the foamed plastic is cured to encapsulate the same and the aforesaid structural members of the frame. And as indicated, suitable conduits are also embedded within the plastic core 20 to pass wiring and controls as required.

In accordance with this invention, the frame width is converted from 8 feet for highway mobility to 12 feet for operational utility, so that the overall width is 14 feet when the skirts A are inflated as later described. Accordingly, the sponsons S are moveable with respect to the hull H from an inboard position overlying the hull deck 11 as shown in FIGS. 1, 3, 6 and 8 to an outboard position overlying the hull sides 12 as shown in FIGS. 2, 4, 7 and 9. In practice, the hull depth is 18 inches in which case the sponsons S are preferably 18 inches square in cross section to extend coextensive of the sides 12 and hingedly attached thereto along the deck line as by means of a piano-type hinge 21. The plan form of the sponsons S is elongated with the bow and stern ends truncated at 22 and 23, at the bow so as to conform with the sled bow form of the hull H, and the sides at the stern at a 45° angle, to be supported by the perimeter skirt A. As with the hull H, a feature of the sponsons is the non-sinkable structure thereof which comprises a space frame 25 within a shell 26 filled with cellular plastic having flotation capability together with the hull of approximately 200% of the gross weight involved. As shown, the space frame 25 involves tubular longitudinal and transverse members defining the corners of the bottom 10' and deck 11' at the side extremities thereof, and of the bow and stern truncations thereof; and various other transverse beams and trusses as may be required for rigidity. The shell 26 presents a closed chamber or vessel which is then filled to capacity with a formed cellular plastic core of substantially light weight, 2 lbs. per cubic foot, and which is impervious to water so as to ensure flotation.

The skirt system of this air cushion vehicle involves the perimeter skirt A and the roll stabilizer divider D, fabricated of plasticized woven fiber tubes that are inflated by the lift air means B into a continuous tube form so as to present a depressible barrier with an air lift plenum therewithin. The combination of woven fiber and plastic produces an extremely wear resistant material that is flexible and substantially unaffected by climatic variations. A feature of the skirt system is the dynamic inflation of the interconnected cylinders of the skirt A and divider D, by ram air from the lift means B as later described. In practice, the inflation air for said cylinders of the skirt system is continuously replenished at slightly greater pressure than the plenum pressure of approximately $\frac{1}{4}$ p.s.i. Characteristically therefore, the skirt cylinders are supple and deflatable, and thereby collapsible and reinflatable. In carrying out this invention with a vehicle dimensioned as above described, the skirt A extends 24 inches below the hull bottom 10 and is comprised of adjoining cylinders along the sides 27 of the sponsons, access the bow 13 and stern 14 of the hull H, and along the bow and stern truncations 22 and 23 of the sponsons S. As shown, there are eight separate skirt cylinders in abutted mitered engagement continuing one from the other. In the preferred form, there are sponson cylinders 32 in open ended communication with a stern cylinder 31 through the truncations 22, while the bow cylinder 30 is a separate cell so as to prevent its collapse and the transfer of air therefrom when encountering obstacles. Accordingly, the two sponson cylinders 32 and communicating stern cylinder 31 present a common substantially air tight chamber separate from the chamber of the bow cylinder 30. The skirt cylinders are 24 inches in diameter and they are attached tangentially to the outer marginal edges of the hull bottom and sponsons bottoms to be carried thereby. The attachment of the skirt cylinders to the hull and sponson bottoms can be permanent in nature, while the continuing engagement of the hull to sponson cylinders is releasable or detachable, as by means of a zippered or laced attachment indicated at 28 between the corner cylinders 29 and the bow and stern cylinders 30 and 31. The sponson cylinders 32 remain attached to the truncating corner cylinders 29, to fold up with the sponsons when the configuration of the vehicle is diminished for highway mobility. All skirt cylinders 29-32 are readily replaced by means of said zippered or laced attachment to the hull, and to the sponsons, and to each other.

In accordance with this invention, the normal dependency of the skirt A from the hull and sponson bottoms 10 and 10' is ensured by the provision of restraining curtains 65 that extend tangentially from the hull and sponson cylinders 30-32 diagonally inboard to guy the working positions of said skirt cylinders. Accordingly and as shown, the entire peripheral skirt A is held inward by the restraining curtains 65 attached to the inboard corner member of each sponson (see FIG. 10) and to cross members of the hull (see FIG. 11) at both the bow and stern (see FIG. 5). The restraining curtain wraps partially around the cylinder diameter so as to provide protection therefor over the potential wear area, and it is zippered or laced into place so as to be replaceable.

The air cushion roll stabilizer divider D separates the air lift plenum into two like chambers disposed longitudinally of and underlying the hull H and opposite sponsons S. As shown, the divider D is attached to the bottom 10 of the hull H along the centerline thereof to depend 22 inches below the hull bottom, and is comprised of a cylinder 33 that is 22 inches in diameter and fabricated the same as the aforementioned cylinders 29-32. The divider cylinder 33 is secured to the hull bottom 10 along a single line (see FIG. 10) and is free to be pressured toward either side, thereby to increase the duct area to one chamber while decreasing it to the other. Side to side movements of the divider D beneath the duct 35 are responsive to the plenum chamber pressure changes as ground clearances vary from side to side, and provides lateral stability tending to prevent one side from dropping and the other side from raising as obstacles are encountered to vary plenum chamber pressures. As is shown, the divider cylinder is reinforced with a wear strip S1, and the sponson and bow and stern cylinders are reinforced with tread strips S2 and S3 for ground engagement (see FIG. 10). Accordingly, the divider D extends between the bow and stern cylinders and beneath the blower duct 17 to separate the lift air into two like columns and one directed to each chamber of the plenum. There is a keel member 34 extending coextensive along the hull bottom, bridging the blower duct, and to which the cylinder 33 is attached as by zipper means or lacing.

The lift air means B is provided to inflate the skirt system A and to pressure the plenum chambers beneath the bottom 10 of the hull and sponsons S positioned outboard to augment the width of the vehicle. The means B is situated over and supplies a moving air column into the blower duct 17, downwardly therethrough and into the plenum beneath the hull H and within the confines of the perimeter skirt A. The means B features a ducted fan, comprised of a vertically disposed duct 35 flared to open upwardly for the downward thrust of an air column by means of a fan 36 operating therewithin. The roll divider cylinder 33 extends diametrically of the duct opening into the plenum so as to vary the air flow between the two plenum chambers. The fan axis is concentric with the ducts 17 and 35 for axial flow, being driven by an engine prime mover 38, preferably an internal combustion gasoline aircraft engine, in this instance one of 200 h.p. Control is by engine torque and pitch of the fan blading. In order to provide a substantially unobstructed duct 17-35, the engine 38 is removed to one side and disposed on a horizontal axis with a right angle gear box drive 38' transmitting torque to the fan 36 through a centrifugal overriding clutch 39. The centrifugal feature of the clutch provides for unloaded starting and idling of the engine, and the overriding feature provides for "free-wheeling" coastdown, there being a flywheel 39' to allow the engine to continue turning without the fan load. As shown, cooling air is drawn from the fan by means of a ram tube or scoop and returned to the duct 35 by means of a tube 35''.

A feature of the air lift means B is that it provides a nominal plenum chamber pressure while it provides a slightly higher skirt inflation pressure. It is to be understood that leakages will cause variations in these pressures, the system being dynamically supplied with a moving column of air when the lift means B is in operation. In practice, the higher skirt inflation air pressure is attained by providing ram air ducts 66, 66a and 66b in alignment with the blade tips of the fan 36, thereby supplying the bow cylinder 30, the sponson cylinder 32, and the divider D which supplies the stern cylinder 31. As shown, the sponson and stern cylinders are in open communication. As lift air pressure subsides, the skirt system and divider collapse so as to lower the vehicle to the ground or into the water, or a combination of both, as the case may be. The side panels 37 of the blower duct are removeable, or liftable as shown, for fan and gear box access and so as to accommodate the inward stowage of the sponsons (see FIG. 1).

The inflation air delivered from the tips of the fan blades (36) by the lift means B is divided between the sponson cylinders 32 and the bow skirt cylinder 30. As best shown in FIG. 4 of the drawings, the ram air duct 66 feeds the high pressure blade tip air into the divider cylinder 33 that opens into the stern cylinder 31. The ram air duct 66a feeds the high pressure blade tip air into the sponson cylinders 32. And, the ram air duct 66b feeds high pressure blade tip air into the bow cylinder 30. The ram air ducts 66, 66a and 66b are separated approximately 120° apart, as shown. Note that the bow cylinder 30 is closed by end bulkheads 30' (see FIG. 5).

Referring now to the wear strips S1, S2 and S3, the replaceable retainer curtains act to double the thickness of the cylinder walls throughout the ground engagement area thereof. However, in order to provide for ground engagement wear, the wear strips S1 and tread strips S2 and S3 are provided for close proximity operation. The backing for the wear and tread strips is the same as the material of the cylinders and curtains, thereby tripling the ply thickness which is sufficient for the divider cylinder 33. However, the skirt system perimeter depends closer to the ground surface and receives more abuse. Accordingly, the sponson, bow and stern cylinders 32, 30 and 31 are provided with tread cells, comprised of flexible runners 70 that extend longitudinally and parallel with the direction of travel. The runners 70 are rib formations that depend from the exterior surfaces of the cylinders, in spaced parallel relation thereby to form a labyrinth sealing the boundry air. There is of course ground or surface clearance, for example ½ inch more or less, so that the air flow from the plenum is dynamic. A feature however, is the labyrinth seal afforded by the multiplicity of longitudinally disposed runners 70, disposed fore and aft of all skirt cylinders, and which are notched at offset positions (see FIG. 14) to establish a circuitous route for air travel.

The air propulsion means P is provided to thrust the vehicle forward or backward and is confined to the afterbody of the hull H, leaving substantial free deck 11 spaced forward to the ducted fan means B. A feature of the vehicle is the reliability and maneuverability provided by twin thrust units positioned over the right and left sponsons S when in operational position, and retractile to a stowed position within the inboard positioning of the sponsons S when the craft is diminished in size for highway mobility. In accordance with this invention, the pair of thrust units features ducted fans for efficiency and safety, each comprised of a horizontally disposed duct 40 open on a fore and aft axis when in operating position for fore or aft thrust of an air column by means of a propeller 41. The propeller axes are concentric within the ducts for axial flow, being driven by an engine prime mover 42, preferably an internal combustion gasoline aircraft engine, in this instance 200 h.p. each. The two thrust units are mounted together on a turret 43 that revolves 90°, by comparing FIGS. 1 and 2, to be symmetrically positioned side by side in operating position, and to withdraw from the stern 14 and centrally occupy the space between the retracted sponsons S when positioned for a mobile highway travel. Accordingly, the pivotal axis for the turret bridge 43 is offset to one side of the mean centerline between the two thrust units, the control duct 44 thereto acting as a bearing or pedestal upon and about which the thrust units turn in to and out of working position (see FIGS. 1 and 2). The propellers 41 are reversible and/or adjustable, for forward or backward thrust, and the transverse spacing of the two axes thereof is such that asymmetrical control by means of varying their respective thrusts is advantageously employed.

The steering means S is comprised of fans or rudders 46 in the slip stream of the propellers 41, preferably a cascade of rudder vanes disposed on close vertical centers and in close proximity to the propellers, so as to direct the wash thereof to right or left as circumstances require for steerage. As shown, the rudders 46 are pivoted to operate in unison between upper and lower headers 47 carried by the rear discharge side of the ducts and located at the rear of the hull H for effective turning moments.

In carrying out this invention, the working deck 11 is expansive and a pilots cabin 48 is cantilevered forward of the lift duct 35, or appended thereto so as to project forwardly from the bow 13. The cab 48 is a structural tongue member to which the detachable tow bar T is secured, its underbody 49 extending from the top plane of the deck 10.

Referring now to the tracking gear G and nose wheel N for direction control, said gear G and nose wheel N are retractile and depressible at regulated pressure for tracking ground engagement as circumstances require. As shown, right and left tracking gear G are located in the wells 18 aft of the center of gravity, to support the hull frame 15 through trailing arms 50 pivoted to said frame. In carrying out this invention, the trailing arms 50 are lowered to positions that provide minimal ground contact of casters 50' swiveled at the lower end thereof, when operating over terrain. In practice, the caster element is a large ball captured in anti friction bearing means so that it is omni rotatable. As a result, side slip or leeway is accommodated without side loading which a conventional wheeled support cannot tolerate.

The trailing arms are retracted and/or depressed by double acting cylinder and piston means 51 into which compressible fluid is applied at a pressure regulated to effect the desired engaging force; and when operating over water or marsh etc. the tracking gear G remains retracted. Accordingly, the nose wheel N is located at the bow and preferably at the front of the structural cabin tongue where it depends from the underbody 49. As shown, the nose wheel is both retractile and extensible, by comparing FIGS. 1 and 2, and it is steerable as by means of a manually positioned hydraulically operable gear 52. The nose wheel involves a vertically shiftable strut 53 disposed on the vehicle center line, retracted and/or extended by double acting cylinder and piston means 54 into which compressible fluid is applied at a pressure regulated to effect the desired ground engaging force, applied separately or complimentary to the tracking gear G in a range up to 10% to 20% of the gross vehicle weight; and when operating over water or marsh etc. the wheel N remains retracted. When the steering and tracking gear S and G are retracted, and in the absence of the transport wheels W, the hull H sits upon four skids 67 mounted to the hull bottom 10, in order to protect the hull and to separate the hull bottom from the ground thereby protecting the skirts A as they collapse.

Referring now to the transport wheels W and tow bar T for highway mobility, said wheels and tow bar are preferably removeable for operational utility, and replaceable for highway mobility. In practice although not shown, jacking means is built into or attached to the hull H so as to support the vehicle at a height conducive to installation of the wheels W, the said wheels being located right and left in the wells 18 aft of the center of gravity, to support the hull frame 15 through trailing arms 55 pivoted to said frame. The trailing arms 55 are suspended by torsion bar springs 56 that enter tube adapters through the hull H and in which they bear for wheeled support and are anchored at their inner ends for height adjustment. Securement means 57 is provided to adjustably retain each wheel in working position to trail below the hull H for its support; while the tow bar T is fastened to the front face of the structural tongue member of the cab 48 to extend the same to a fifth wheel 58 in the bed of the tractor vehicle V (see FIGS. 1 and 3).

In the transport mode, this air cushion vehicle is made mobile within highway width restrictions by deflating the skirt system A and by detaching the sponson skirt cylinders from the bow and stern cylinders thereof. The collapsed skirt system loses its cylinder configuration and becomes flattened so as to be tied to or laced to the structural members to which they are permanently attached (see FIG. 13). The propulsion means B is rotated into the position shown in FIGS. 1 and 3 and secured. The sponsons S are then released from the hull at the securement means 60 therefor and revolved into retracted positions overlying each side margin of the hull (see FIG. 3). Finally, the transport wheels W are applied and the tow bar T applied, as above described and coupled to the draft vehicle V.

In the utility mode, this air cushion vehicle is made operational by removing the transport wheels W and tow bar T, while maintaining vehicle height by means of jacks or stands (not shown). The sponsons S are then revolved into extended working positions projecting from each side 12 of the hull H, and secured by means 60. With the structure in this stage of conditioning, the skirt system is zippered or laced together at the abutting mitered joints thereof, ready for inflation whereupon the vehicle is operational. The vehicle becomes dynamic with operation of the powered means B and P and is directionally controlled by means of the steering means S (also by means of the asymmetric throttling of the two laterally spaced propulsion units) and nose wheel N coordinated by the steering gear 52. It is to be understood that conventional means are provided for the various functions attendant to personal accommodations and comforts and to the operation of auxiliaries related to the vehicle as indicated and shown.

Having described only typical preferred forms and applications of my invention, I do not wish to be limited or restricted to the specific details herein set forth, but wish to reserve to myself any modifications or variations that may appear to those skilled in the art as set forth within the limits of the following claims.

I claim:

1. An air cushion vehicle operable over land, water and ice separately and in combination, and including; an elongated hull of rectangular configuration having a flat bottom extending from side to side and from bow to stern, a perimeter skirt coextensive of the hull sides bow and stern and comprised of air inflated cylinders in continuous abutted end to end engagement attached tangentially to marginal edges of the hull bottom, inboard curtains extending diagonally outward from the hull bottom and tangentially to the skirt cylinders to restrain the same, ducted fan lift means discharging vertically through the hull and from the bottom thereof and into a plenum defined by the perimeter skirt cylinders and restraining curtains, propeller propulsion means thrusting longitudinally of the hull, and steering means operable to laterally deflect the thrust of the propulsion means.

2. The air cushion vehicle as set forth in claim 1, wherein retractile and steerable ground engageable tracking means depends from the hull externally of said perimeter skirt.

3. The air cushion vehicle as set forth in claim 1, wherein a retractile and steerable nose wheel depends forward of said perimeter skirt for ground engagement.

4. The air cushion vehicle as set forth in claim 1, wherein a retractile and steerable nose wheel depends forward of said perimeter skirt by means depressibly extending the same to ground engagement below said skirt.

5. The air cushion vehicle as set forth in claim 1, wherein a retractile and steerable nose wheel depends forward of said perimeter skirt by means depressibly extending the same to ground engagement below the lowermost plane of the skirt, and wherein retractile tracking arms depend from opposite sides of the afterbody for ground engagement at the lowermost plane of the skirt.

6. The air cusion vehicle as set forth in claim 1, wherein a retractile and steerable nose wheel depends forward of said perimeter skirt by means depressibly extending the same to ground engagement below the lowermost plane of the skirt, and wherein retractile arms depend from opposite sides of the afterbody for omni-directional rolling engagement of ball members at the lowermost ground plane of the skirt.

7. The air cushion vehicle as set forth in claim 1, wherein a roll stabilizer divider comprised of an air inflated cylinder extends between the bow and stern cylinders of the perimeter skirt, wherein the ducted fan lift means is positioned to discharge at both sides thereof into separate plenum chambers defined by said divider, wherein a retractile and steerable nose wheel depends from the bow by means depressibly extending the same for ground engagement, and wherein retractile tracking arms with casters depend from the afterbody for omni-directional rolling ground engagement.

8. A highway transportable air cushion vehicle having an operational width greater than permitted for highway travel, and including; an elongated hull of rectangular configuration having a width permissible for highway travel and a flat bottom extending between flat sides and from bow to stern, sponsons coextensive with and moveable into and out of positions adjacent said sides respectively and having bottoms to continue the flat bottom of the hull, a perimeter skirt coextensive of the sponsons and bow and stern of the hull and comprised of air inflated cylinders in continuous separably abutted end to end engagement attached tangentially to marginal edges of the hull and sponson bottoms, inboard curtains extending diagonally outward from the hull and sponson bottoms and tangentially to the skirt cylinders to restrain the same, ducted fan lift means discharging vertically through the hull and from the bottom thereof and into a plenum defined by the perimeter skirt, propeller propulsion means thrusting longitudinally of the hull, and steering means operable to laterally deflect the thrust of the propulsion means.

9. The transportable air cushion vehicle as set forth in claim 8, wherein the sponsons are truncated at the bow and stern thereof to meet the same, the skirt cylinders being abutted at said truncations in mitered relation to continue one from the other.

10. The transportable air cushion vehicle as set forth in claim 8, wherein the forebody of the hull is extended with a tongue for support by a fifth wheel of a tractor vehicle for highway transport.

11. The transportable air cushion vehicle as set forth in claim 8, wherein the afterbody of the hull has wheel wells for the accommodation of wheeled supports positioned therein to depend from the hull for highway engagement with the sponsons removed from the sides of the hull, and wherein the forebody of the hull is extended with a tongue for support by a fifth wheel of a tractor vehicle for highway transport.

12. The transportable air cushion vehicle as set forth in claim 8, wherein the sponsons are truncated at the bow and stern thereof to meet the same, the skirt cylinders being abutted at said truncations in mitered relation to continue one from the other, wherein the sponsons are hingedly joined to the hull at the deck of the hull to outwardly continue the same and to retract inwardly into position upon the same, and wherein the afterbody of the hull has wheel wells for the accommodation of wheeled supports positioned therein to depend from the hull for highway engagement with the sponsons removed from the sides of the hull.

13. The transportable air cushion vehicle as set forth in claim 8, wherein the sponsons are truncated at the bow and stern thereof to meet the same, the skirt cylinders being abutted at said truncations in mitered relation to continue one from the other, wherein the sponsons are hingedly joined to the hull at the deck of the hull to outwardly continue the same and to retract inwardly into position upon the same, and wherein the forebody of the hull is extended with a tongue for support by a fifth wheel of a tractor vehicle for highway transport.

14. The transportable air cushion vehicle as set forth in claim 8, wherein the sponsons are truncated at the bow and stern thereof to meet the same, the skirt cylinders being abutted at said truncations in mitered relation to continue one from the other, wherein the sponsons are hingedly joined to the hull at the deck of the hull to outwardly continue the same and to retract inwardly into position upon the same, wherein the afterbody of the hull has wheel wells for the accommodation of wheeled supports positioned to depend from the hull for highway engagement with the sponsons removed from the sides of the hull, and wherein the forebody of the hull is extended with a tongue for support by a fifth wheel of a tractor vehicle for highway transport.

15. The transportable air cushion vehicle as set forth in claim 8, wherein the propeller propulsion means comprises a pair of thrust units mounted together on a turret in laterally spaced relation, said turret being pivoted upon the hull and operable between an inactive position overlying the hull and an operable position overlying both the hull and the sponsons.

16. The transportable air cushion vehicle as set forth in claim 8, wherein the sponsons are hingedly joined to the hull at the deck of the hull to outwardly continue the same and to retract inwardly into position upon the same, and wherein the propeller propulsion means comprises a pair of thrust units mounted together on a turret in laterally spaced relation, said turret being pivoted upon the hull and operable to extend longitudinally between the inwardly positioned sponsons in an inactive position overlying the hull and to extend transversely over the hull in an operable position overlying both the hull and the sponsons.

17. An air cushion vehicle operable over land, water and ice separately and in combination, and including; an elongated hull of rectangular configuration having a flat bottom extending from side to side and from bow to stern, a perimeter skirt coextensive of the hull sides bow and stern and comprised of inflatable cylinders in continuous openly abutted end to end engagement to form at least one common chamber, a roll stabilizer divider comprised of an inflatable cylinder extending between the bow and stern cylinders of the perimeter skirt and open into one of said cylinders to be in open communication with said at least one common chamber of the perimeter skirt, ducted fan lift means discharging nominal lift pressure air into a plenum defined by the perimeter skirt and discharging high inflation pressure air into the at least one common chamber of the perimeter skirt, propeller propulsion means thrusting longitudinally of the hull, and steering means operable to laterally deflect the thrust of the propulsion means.

18. The air cushion vehicle as set forth in claim 17, wherein the ducted fan lift means discharges its high inflation pressure air into the said divider cylinder for distribution into said at least one common chamber of the perimeter skirt.

19. The air cushion vehicle as set forth in claim 17, wherein the ducted fan lift means has a ram air duct aligned with the high pressure inflation air delivered at the blade tips of the fan thereof and into the said divider cylinder for distribution into said at least on common chamber of the perimeter skirt to inflate the same.

20. The air cushion vehicle as set forth in claim 17, wherein the perimeter skirt cylinders are restrained from outward deflection by means of inboard curtains extending tangentially to the skirt cylinders from the hull and diagonally outward thereto.

21. The air cushion vehicle as set forth in claim 17, wherein the perimeter skirt cylinders are restrained from outward deflection by means of inboard curtains extending tangentially to and circumferentially around the skirt cylinders for reinforced wear thickness and from the hull and diagonally outward from the hull to said cylinders.

22. The air cushion vehicle as set forth in claim 17, wherein the roll stabilizer divider forms two separate plenum chambers and is moveable laterally and responsive to variations in plenum pressure to move side to side and control the discharge of ducted fan lift air into the separate plenum chambers respectively for stabilization when encountering obstacles that disturb the ground clearance discharge of air beneath the skirts.

23. The air cushion vehicle as set forth in claim 17, wherein the perimeter skirt cylinders are restrained from outward deflection by means of inboard curtains extending tangentially to the skirt cylinders from the hull and diagonally outward thereto, and wherein the roll stabilizer divider forms two separate plenum chambers and is moveable laterally and responsive to variations in plenum pressure to move side to side and control the discharge of ducted fan lift air into the separate plenum chambers respectively for stabilization when encountering obstacles that disturb the ground clearance discharge of air beneath the skirts.

24. The air cushion vehicle as set forth in claim 7, wherein the roll stabilizer divider forms two separate plenum chambers, wherein the ducted fan means has a ram air duct aligned with the high pressure inflation air delivered at the blade tips of the fan thereof and into the divider to inflate the same and the perimeter skirt open thereto, wherein the perimeter skirt cylinders are restrained from outward deflection by means of inboard curtains extending tangentially to the skirt cylinders from the hull and diagonally outward thereto, and wherein the roll stabilizer divider is flexibly attached along the center of the hull bottom and moveable responsive to variations in plenum pressure to shift side to side and control the discharge of ducted fan lift air into the separate plenum chambers respectively for stabilization when encountering obstacles that disturb the ground clearance discharge of air beneath the skirts.

25. An air cushion vehicle operable over land, water and ice separately and in combination, and including; an elongated hull of rectangular configuration having a flat bottom extending from side to side and from bow to stern, a perimeter skirt coextensive of the hull sides bow and stern and comprised of inflatable cylinders in continuous abutted end to end engagement, there being a plurality of spaced runners depending from the perimeter skirt and disposed longitudinally with the direction of travel and in the form of a labyrinth seal at the air boundary of the plenum and for ground engagement, ducted fan lift means discharging nominal lift pressure air into a plenum defined by the perimeter skirt and discharging high inflation pressure air into the perimeter skirt, propeller propulsion means thrusting longitudinally of the hull, and steering means operable to laterally deflect the thrust of the propulsion means.

26. The air cushion vehicle as set forth in claim 25, wherein the said runners are notched in offset relation to provide a tortuous path for retarding the escape of air from the plenum.

* * * * *